United States Patent Office 3,654,224
Patented Apr. 4, 1972

3,654,224
HYDROXYL OR THIOL TERMINATED
TELOMERIC ETHERS
Jack Milgrom, Concord, Mass., assignor to the General
Tire & Rubber Company
No Drawing. Filed Oct. 20, 1967, Ser. No. 676,712
Int. Cl. C07c 69/60, 69/80
U.S. Cl. 260—475 P                                 15 Claims

ABSTRACT OF THE DISCLOSURE

Hydroxyl or thiol terminated alkylene ether telomers varying from liquids to thermoplastic solids and composed of one or more telomer moieties from a cyclic ether taxogen joined through a carbon atom to a telogen moiety are prepared by telomerization of a cyclic ether monomer with a telogen in the presence of a catalyst of the double metal cyanide complex class. As a specific example, a hydroxyl terminated diester of the formula:

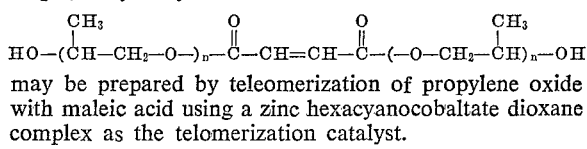

may be prepared by telomerization of propylene oxide with maleic acid using a zinc hexacyanocobaltate dioxane complex as the telomerization catalyst.

BACKGROUND OF THE INVENTION

The invention relates to improvements in several established chemical operations, namely, (a) use of complex cyanide catalysts for polymerizations, (b) telomerizations, and (c) preparations of complex polymeric ethers. Utilizing new techniques within these general categories of reactions, new forms of polymeric ethers have been created which are distinguished in part, by chemical structure, and, in part, by physical properties from polymeric ethers known heretofore.

The usefulness of complex cyanide catalysts for the preparation of polyethers is known and organoactivated catalyst complexes of this class have been fully described, e.g., see U.S. 3,278,457; 3,278,458 and 3,278,459. The use of these catalysts is now extended as disclosed herein into the telomerization of cyclic ethers, e.g., alkylene oxides, with carboxylic acids or some other telogens having replaceable hydrogen atoms.

The mechanism of telomerization has been understood in the chemical arts for some time (see U.S. 2,409,683). As originally defined by Hanford et al. (U.S. 2,402,137), telomerizations are a form of polymerization in which a reactant, called a telogen, enters the reaction to limit molecular weight of the resulting product according to the general equation:

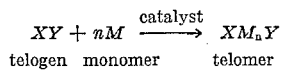

The telomerization reaction is extended by the present invention according to the following equation:

$$XY_a + nM \rightarrow X(M_{n/a}Y)_a$$

where $a$=the number of telogenic functions in the telogen;
$n$=the number of monomer units, and
$n/a$=the average number of monomer molecules in the telomer moiety.

The monomer, which is also called a taxogen, is the major reactant in a telomerization and the telomer moiety derived from the taxogen constitutes generally the principal mass of the telomerization product. In the procedures of this present invention, any individual polymer molecule of the polymeric mass has one telogen moiety. Since the major telomer moieties are polyether groups which are hydroxyl or thiol terminated, the new products can also be designated as polyether polyols or polyether polythiols.

polymerization by a "growth type" of reaction in which there is a continuing transfer of a proton from an active site generated by the catalyst to a new monomer molecule. This type of reaction enables block copolymers to be created by sequential addition techniques and this can be utilized in this present invention to form new telomeric polyethers of block copolymer configuration. In the new processes, it is believed the telogen, e.g., a carboxylic acid, acts as a chain transfer agent and produces polymers of controlled molecular weight and narrow molecular weight distribution in preferred embodiments. The efficiency of this growth type reaction is emphasized by the fact that as many as 500 telomer chains per catalyst unit may be formed.

OBJECTS

A principal object of this invention is the creation of new forms of hydroxyl or thiol terminated polymeric alkylene ethers. Further objects include the provision of:

(1) New polyether ester polyols or polythiols prepared by telomerization methods using carboxylic acids as telogens.

(2) New methods of utilizing organoactivated double metal cyanide complex catalysts.

(3) New polyols or polythiols with good functionality having an average molecular weight range of from about 300 to 10,000.

(4) Polyether or thioether esters made from tri-, tetra- and higher polycarboxylic acids.

(5) New methods of producing polyether or thioether esters.

(6) New hydroxyl terminated polyethers having a plurality of polyether chains are joined through oxygen atoms to a central acid moiety.

(7) New methods of telomerizing cyclic ethers with carboxylic acids, esters, amides, ureas, nitriles, amine, beta-diketones, beta-ketone esters and ethynyl compounds as telogens.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

These objects are accomplished through the present invention by reacting at least one polymerizable cyclic ether containing 2 to 18 carbon atoms as hereinafter defined, in the presence of a polymerization catalyst o fthe (preferably organoactivated) double metal cyanide complex class, with a telogen having a replaceable hydrogen atom(s), e.g., a carboxylic acid, thereby producing hydroxyl or thiol terminated alkylene ether or thioether telomer, e.g., telomeric carboxylic esters as hereinafter defined.

The term "cyclic ether" is used in this specification and accompanying claims to include compounds that comprise either oxygen or sulfur atoms in the cyclic ether ring. Such compounds useable in this invention can be designated by the following general formula:

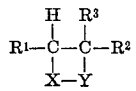

wherein:

X is oxygen or sulfur,

Y is —$CH_2$— or the bond in the cyclic ether between the carbon atom and the hetero-atom "X" and $R^1$, $R^2$ and $R^3$ are hydrogen, hydrocarbon, halohydrocarbon, carbon oxycarbon, carbonthiacarbon, halocarbonoxycarbon or halocarbonthiacarbon radicals.

Advantageously, such monomers for the new telomerizations are organic cyclic oxide monomers having a ring of 2 to 3 carbon atoms and 1 oxygen atom, the oxide being an epoxide, oxetane, 3-substituted oxetane or 3,3-disubstituted oxetane. Mixtures of any of the cyclic ethers as defined may be employed or different monomers may be charged into the reaction sequentially.

The telogen for the reaction can be a carboxylic acid which can be mono or polyfunctional, saturated or unsaturated, unsubstituted or hydroxyl containing, e.g., aliphatic, aromatic, heterocyclic or polymeric acids. However, the new procedures are broad spectrum relative to the telogens and a variety of other type compounds may serve as the telogen, namely, amides, ureas, amines, acetylenes, esters, nitriles, β-diketones and β-ketoesters. The catalysts are of the known double metal cyanide complex type containing a metal ion which is joined to the nitrogen atom of a cyano group by a coordinate bond and a transition metal having a relatively strong covalent bond with the carbon atom of the cyano group. Advantageously, the catalysts are activated by an organic complexing agent, e.g., alcohol, aldehyde, ketone, ether, ester, sulfide, amide, or nitrile.

In general terms, the invention provides a new class of hydroxyl or thiol terminated alkylene ether telomers that may be represented by the general formula:

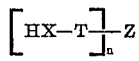

wherein

X is oxygen or sulfur,

T is the telomer moiety from a polymerizable cyclic ether as hereinbefore defined, n is an integer, particularly between 1 and 3, Z is a telogen moiety from an organic compound having an activated or replaceable hydrogen atom(s) selected from the following group:
  carboxylic acids,
  carboxylic acid esters,
  aromatic amides,
  aromatic substituted ureas,
  primary and secondary aromatic amines,
  acetylene and substituted acetylenes,
  β-diketones,
  β-keto esters,
  β-dinitriles, and
  β-ester nitriles.

Activated hydrogen atoms are those adjacent carbonyl radicals, on the carbon atom of a triple bond and so forth; and they, also, are replaceable. Replaceable hydrogen atoms are those of carboxylic groups, amino groups and so forth. In addition to carboxylic groups, acids may contain amide, amino, ethynyl, and hydroxyl groups.

Polycarboxylic acids are particularly useful as the telogen and they may be used to prepare a new class of hydroxyl or thiol terminated alkylene ether telomeric carboxylic esters represented by the general formula:

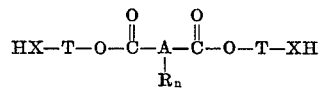

wherein:

X and T are as hereinbefore defined,

A is the non-acid moiety of a polycarboxylic acid,

R is

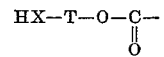

and n is 0 or an integer of 1 to 4.

Advantageously, A is a radical selected from the group consisting of aliphatic, aromatic, cycloaliphatic, halo aliphatic, hydroxyaliphatic, cyanoaliphatic and carbonyl aliphatic.

EXAMPLES

The following details of operations in accordance with the invention and reported data illustrate the further principles and practice of the invention to those skilled in the art. In these examples and throughout the remaining specification and claims, all parts and percentages are by weight all temperatures are in degrees centigrade unless otherwise specified.

EXAMPLE 1

Dry isophthalic acid (6.2 parts) was charged into dry reaction vessel containing 0.1 part of zinc hexacyanocobaltate (111)-glyme complex as a catalyst. The reaction vessel was flushed with nitrogen and purified propylene oxide (150 parts) was added. The vessel was then sealed and placed in an end-over-end rotating assembly and maintained at 50° C. for 20 hours. After this time, a clear liquid product was recovered in an essentially quantitative yield. The liquid product was titrated with aqueous base and found to contain only a negligible concentration of unreacted isophthalic acid. The molecular weight, calculated upon the assumption that a complete reaction occurred, was 4200. The liquid product was analyzed and found to contain 0.55 mmole of hydroxyl per gram.

EXAMPLE 2

Adipic acid (5.6 parts) was reacted with propylene oxide (150 parts) in the presence of 0.1 part of the same type of catalyst as employed in Example 1. The telomerization process of Example 1 was followed. After 20 hours, approximately 100% conversion of the material to a liquid polymer was obtained. The liquid polymer had a negligible acid number and the hydroxyl content was 0.624 mmole per gram. On the assumption of a complete reaction, the molecular weight was 3300, and the polymer had about two hydroxyl groups per molecule.

EXAMPLE 3

23.8 parts of 4,4-di(p-hydroxy phenyl) valeric acid were reacted with propylene oxide (150 parts) using the same method and the same type of catalyst as set forth in Example 1. After 20 hours, little reaction was apparent and, therefore, an additional 0.2 part of the catalyst was added and the vessel and contents maintained at 50° C. and rotated as above for another 24 hours. At the end of this time, the reaction still seemed to be going slow. Therefore, an additional 0.4 part of the catalyst was added so that the total weight of the catalyst was 0.7 part. At the end of the reaction, a liquid product was recovered in an essentially quantitative yield. The liquid product contained a negligible amount of acid and had a molecular weight determined by vapor phase osmometry of 1750.

EXAMPLE 4

Into a metal autoclave equipped with an oil-driven stirrer were charged 2500 parts of propylene oxide, 227 parts of phthalic acid and 1.5 parts of zinc hexacyanocobaltate (III)-glyme complex. The autoclave was then heated at 50° C. for 19 hours with stirring. At this time, all the reactants were converted to a polymer which was a liquid product. The liquid was found to have a Brookfield viscosity of 1068 cp. at 24° C. and a hydroxyl content of 1.09 mmoles per gram. The calculated molecular weight, assuming complete reaction, was 2000 showing the polymer to have a hydroxyl content of about 2.2 groups per molecule.

EXAMPLE 5

There were charged into an autoclave as in Example 4, 1500 parts of propylene oxide, 232 parts of maleic acid and 3 parts of zinc hexacyanocobaltate (III)-glyme complex catalyst. After nitrogen flushing and sealing of the autoclave, the mixture was heated at 77° C. for 7 hours with stirring. At the end of this time, the reactants had been converted to liquid polymer. An additional amount of propylene oxide (1500 parts) was added and the reaction heated with stirring for an additional 7 hours. A quantitative yield of a liquid polymer was obtained. Analysis of the polymer indicated that it had a hydroxyl content of 1.37 mmoles per gram. The molecular weight as found by vapor phase osmometry was 1400 giving a polymer having an average of 1.9 hydroxyl groups per molecule.

In a subsequent operation, the resulting polymer and a polyoxyalkylene triol in equivalent amounts were reacted with toluene diisocyanate at an NCO/OH ratio of 1.4:1 yielding a film-forming polyetherurethane that had a tensile strength of 330 pounds p.s.i., and a modulus at 100% extension of 303 p.s.i.

EXAMPLE 6

Into the autoclave of Example 4, there were charged 1500 parts of propylene oxide, 464 parts of furmaric acid, and 1 part of zinc hexacyanocobaltate (III)-glyme complex catalyst. After nitrogen flushing and sealing of the autoclave, the mixture was heated at 77° C. for 5 hours with stirring. At that time an additional 2 parts of the complex catalyst were added. The heating and stirring was continued for an additional 8.5 hours and the autoclave pressure dropped to 9 p.s.i. At this point, an additional 1 part of the complex catalyst was added and an additional 1650 parts of propylene oxide were charged incrementally over a 6-hour period. An additional 1 part of the complex catalyst was added and an additional 2850 parts of propylene oxide were added incrementally over a 15-hour period. Thus, a total of 6000 parts of propylene oxide were added to the reactor in 34.5 hours, producing a liquid polymer having a hydroxyl content of 1.185 mmoles per gram and having a molecular weight of 1700 (VPO).

EXAMPLE 7

Into a dry glass reaction vessel as in Example 1 there were placed .06 part of zinc hexacyanoferrate diglyme complex and a magnetic stirring bar. The vessel and its contents were then dried further at less than 1 mm. Hg for 1 hour. Propylene oxide (50 parts) was added and the contents of the sealed vessel were then agitated by means of the magnetic stirrer at 25° C. for 25 minutes at which time the complex became finely dispersed in the oxide. Then the mixture was transferred to another reaction vessel containing one part of terephthalic acid. The heterogeneous reaction mixture was then placed in an end-over-end rotating assembly at 50° C. for 114 hours. At the end of this period, no terephthalic acid was detectable in the resulting clear solution. After evaporating unreacted propylene oxide, 2.2 parts of a grease-like material were obtained. The product (propylene glycol terephthalate) was neutral and was identified as an ester of terephthalic acid by infrared spectrum analysis. The ester had a molecular weight of 560 and contained 3.42 mmoles of hydroxyl per gram and a calculated functionality of 1.9.

EXAMPLE 8

The procedure of Example 6 was repeated with the modification that in place of propylene oxide charged incrementally over a 6 hour period, 1000 parts of propylene oxide and 500 parts of 1,2-butene oxide were used. These oxides were charged separately in 50-part increments of 1,2-butene oxide alternated with increments of 100 parts of propylene oxide over the 6-hour period. A similar operation was used for incremental and alternate addition of 2000 parts of propylene oxide and 1000 parts of 1,2-butene oxide in place of the 2850 parts of propylene oxide over a 15-hour period. The resulting liquid esters comprised telomeric segments of 1,2-butene oxide-propyleneoxide block copolymer and had an estimated molecular weight of 1800.

EXAMPLE 9

The procedure of Example 1 was repeated using a mixture of 4.2 parts isophthalic acid and 2.0 parts of maleic acid in place of the 6.2 parts of isophthalic acid. A clear liquid product was obtained in good yield which upon analysis was found to contain virtually no unreacted acid.

EXAMPLE 10

The general procedure of Example 1 was repeated using the same catalyst with propylene oxide in varied amounts and with varied acids to produce the results delineated in the following table:

TABLE I

| Acid | Weight percent catalyst | Weight percent | Temp. | Time | Expected | Found |
|---|---|---|---|---|---|---|
| Adipic | 3.7 | .07 | 50 | 20 | 4,000 | 3,200 |
| Maleic | 7.2 | .12 | 77 | 12 | 1,370 | 1,350 |
| Isophthalic | 4.1 | .07 | 50 | 20 | 4,000 | 3,620 |
| Phthalic | 8.3 | .067 | 50 | 16 | 2,000 | 1,830 |
| Fumaric | 7.2 | .12 | 77 | 18 | 1,370 | 1,350 |
| Itaconic | 6.1 | .13 | 50 | 15 | 1,600 | ------ |
| "Het" | 4.9 | .13 | 80 | 18 | 8,000 | 4,600 |

In the table, the designation "Het" means hexachlorodicycloheptene dicarboxylic acid; the column headed "Wt. percent" gives the percent in weight based upon the weight of the propylene oxide used of the acid listed in the column headed "Acid"; the column headed "Cat. Wt. percent" gives similarly the weight percentage of the catalyst; the temperature is given degrees centigrade; and the time in hours. Under the column headed "Expected" is reported the calculated molecular weight based upon complete reaction of the reagents and the column headed "Found" reports the molecular weight found by end group analysis assuming difunctionality.

EXAMPLE 11

This example illustrates the preparation of a hexacyanoferrate catalyst and its use in the telomerization of propylene oxide using an ethynyl compound as telogen.

A solution of 17.7 parts of $K_3Fe(CN)_6$ in 125 parts of distilled water was rapidly added to a solution of 12.1 parts of $ZnCl_2$ in 47 parts of distilled water. This produced an orange precipitate to which 177 parts of distilled diglyme were added and stirred for 20 minutes giving a thick mass. The precipitate was then alternately centrifuged and washed with 90% diglyme—10% water until free of chloride ions as determined by adding Cu—$(NO_3)_2$, centrifuging and adding 1% $AgNO_3$. Hexane (132 parts) and diglyme (378 parts) were added and the mixture was allowed to stand for about 12 hours. The slurry then had 198 parts of hexane added to it and the mixture was azeotropically distilled under vacuum at 35° C. for 6 hours until no further water was collected. The slurry was then poured into a soxhlet extractor, allowed to drain nearly dry, and was then extracted with pentane for 48 hours. At the completion of the extraction, the resulting product was a yellow-green cake. When dried in a vacuum desiccator for 24 hours, an extremely fluffy yellow powder was obtained. This was used as the catalyst.

There were charged into a glass reaction vessel, 66.4 parts of propylene oxide, 14.4 parts of 1-hexyne and 0.025 part of the zinc hexacyanoferrate catalyst. The mixture was heated for 17 hours at 35° C., then 24 at 50° C. and finally 8 hours at 80° C. After evaporating all volatile materials from the reaction mixture and then drying at 60° C. and a vacuum of below 1 mm. Hg, 5.4 parts of an orange, grease-like product were recovered. An infrared spectrum of the product showed the presence of —OH groups, but the absence of the ethynyl group (HC≡C—).

However, a substituted acetylene group was established as present by unsaturation analysis (Hg—catalyzed bromination). The product exhibited the following analysis:

Mol. wt. (VPO): 3360
Hydroxyl content: 0.353 mmol/g.
Acetylene content: 0.32 mmol/g.
Functionality based on OH: 1.18
Functionality based on —C≡C—: 1.08

EXAMPLE 12

A mixture of 40 parts of propylene oxide, 2 parts of diethyl malonate and 0.07 part of the catalyst of Example 11, above, was heated in a suitable reaction vessel for 24 hours at 50° C. After removal of unreacted materials by distillation, the residue was dried at 100° C. under a vacuum below 1 mm. Hg. There were obtained 3.7 parts of a yellow oil. The infrared spectrum of the oil confirmed the presence of hydroxyl groups and the absence of propylene glycol and diethyl malonate. Analysis of the product revealed:

Mol. wt. (VPO): 1140
OH content: 0.887 mmole/g.
Functionality based on OH: 1.0

EXAMPLE 13

A mixture of 50 parts of propylene oxide, 1 part of benzamide and 0.03 part of a zinc hexacyanocobaltate-glyme catalyst was reacted for 18 hours at 50° C. and then 24 hours at 80° C. Unreacted propylene oxide was evaporated and the product was dried at 60° C. under vacuum below 1 mm. Hg. A residue representing the product was obtained in the amount of 3.5 parts. A VPO determination indicated a molecular weight of about 400. Infrared analysis showed the product to contain an aromatic ring, but nil benzamide. The —OH, —NH content was 7.06 mmoles/gram.

EXAMPLE 14

A mixture of 50 parts propylene oxide, 1 part acetanilide and 0.03 part of zinc hexacyanocobaltate-glyme catalyst was reacted at 50° C. for 16 hours. After suitable separation of unreacted materials, 45 parts of product were obtained corresponding to 1500 parts of propylene oxide per part of catalyst. Infrared analysis of the oily product confirmed that all the acetanilide had reacted and further analysis revealed:

Mol. wt. (VPO): 5200
OH content: 0.198 mmole/g.
Functionality: 1.0

EXAMPLE 15

A slurry of 50 parts propylene oxide, 1 part of 2,2'-dimethyl carbanilide and 0.03 part of zinc hexacyanocobaltate-glyme catalyst was heated for 48 hours at 50° C. The substituted urea dissolved completely in mixture as the reaction continued and there was a 100% product yield of a heavy oil.

In another case, heating at 80° C. of the propylene oxide and the dimethyl carbanilide in the absence of the catalyst failed to produce any dissolving of the latter in the oxide.

Infrared analysis of the heavy oil product showed the presence of both secondary and tertiary amide groups along with hydroxyl groups. The molecular weight (VPO) was 8200.

EXAMPLE 16

A mixture of 100 parts propylene oxide, 3.3 parts of aniline and 0.06 part of zinc hexacyanoferrate-diglyme catalyst was heated for 48 hours at 35° C. After the unreacted monomer and telogen were evaporated at 100° C. below 1 mm. Hg for 25 hours, 55.9 parts of a clear orange-brown heavy oil was obtained as the product.

Analysis showed the product to contain less than 0.05% free aniline and the presence of an aromatic ring, hydroxyl groups and secondary amine groups. Analysis further showed that 29% of the aniline had reacted so that both hydrogen atoms on the amino group were replaced to give a polyether diol and 71% reacted only one hydrogen to give a telomer with a hydroxyl group at one end and a C₆H₅NH— group on the other. The telomer molecular weight (VPO) was 1620, the combined —OH and —NH content was 1.203 mmoles/g. and the functionality was 1.95.

In another case, this procedure was repeated using 0.1 part of the catalyst and heating for 50 hours at 35° C. A yield of 98.7 parts of liquid telomer were obtained corresponding to a conversion of 95.5% of the propylene oxide. Analysis of the product produced the following data:

Mol. wt. (VPO): 2520
—OH, —NH content: 0.723 mmole/g.
Functionality: 1.82
Percent diol: 22

In yet another case, 50 parts of propylene oxide and 1.65 parts of aniline were reacted in the presence of 0.03 part of zinc hexacyanocobaltate-glyme catalyst at 35° C. for 49 hours. The yield of liquid telomer was essentially quantitative. Analysis of the product give the following data:

Mol. wt. (VPO): 2800
—OH, —NH content: 0.710 mmole/g.
Functionality: 1.99
Percent diol: 60

In a further case, 100 parts of propylene oxide and 0.2 part of aniline were reacted in the presence of 0.025 part of zinc hexacyanoferrate diglyme catalyst and 0.0255 part of PBNA at 35° C. for 25 hours giving 24.4 parts of a grease-like product which had a molecular weight of 8300, functionality of 2.05 and a combined —OH, —NH content of 0.244 mmole/g.

EXAMPLE 17

Into an autoclave equipped with an oil-driven stirrer, there were charged 2000 parts of propylene oxide and 2 parts of zinc hexacyanocobaltate-glyme catalyst. Then 93 parts of aniline were added and the mixture while being stirred was heated for 12 hours at 50° C. There was 100% conversion to product which had the following analysis:

Mol. wt. (VPO): 2100
—OH, —NH content: 0.973 mmoles/g.
Functionality: 2.0
Percent diol: 67

An equal number of moles of the product and p,p'-diisocyanatodiphenyl urethane were heated and then mixed together at 60° C. in a metal container. The mixture was then cast into a metal pan in which it was oven-baked at 90° C. for 44 hours. A rubbery soluble polyurethane was formed having a Williams Plasticity of 142.

EXAMPLE 18

A mixture of 50 parts propylene oxide and 3 parts of N-ethylaniline was reacted in the presence of 0.03 part of zinc hexacyanocobaltate-glyme complex catalyst at 50° C. for 44 hours. After unreacted PO and EA were removed by evaporation, a yield of 52.2 parts of clear viscous liquid product were obtained. Infrared analysis indicated the absence of —NH groups but the presence of —OH groups and potentiometric titration of the product indicated 76% of the amine charged was converted. Further analysis on the product showed a molecular weight (VPO) of 2200, an —OH content of 0.484 mmoles/g. and a functionality of 1.06.

EXAMPLE 19

A mixture of 2 parts of p-phenylene diamine and 100 parts of propylene oxide was reacted in the presence of 0.1 part of zinc hexacyanoferrate-diglyme complex catalyst at 50° C. for 24 hours. The dark brown, gummy product amounted to 19.5 parts and was soluble in benzene, whereas the diamine was not. Potentiometric titration indicated all of the diamine was consumed giving a product with secondary amine and hydroxyl groups and without tertiary amino groups. The molecular weight was 1071, the combined —NH, —OH content was 3.41 mmoles/g. and the functionality was 3.65.

The product was tested as an antiozonant by addition to a styrene-butadiene rubber (SBR 1502) and also to an acrylonitrile-butadiene rubber ("Hycar 1052"). The product prevented cracking when bent loops of the rubbers were exposed to 50 p.p.h.m. ozone for one hour.

EXAMPLE 20

A mixture of 50 parts of propylene oxide and 2.7 parts of p-aminophenol was heated at 50° C. for 16 hours to effect solution. The solution was then mixed with 0.03 part of zinc hexacyanocobaltate-glyme complex catalyst and heated for 24 hours at 50° C. and then 48 hours at 80° C. Infrared analysis showed most of the phenol had reacted in producing 6.9 parts of product. The molecular weight of the telomer was 380±40 (VPO in DMF) and the combined —OH,—NH content was 8.16 mmoles/g. giving a functionality of 3.1.

EXAMPLE 21

A mixture of 50 parts of propylene oxide and 3.4 parts of p-aminobenzoic acid was reacted in the presence of 0.03 part of zinc hexacyanocobaltate-glyme complex catalyst at 50° C. for 48 hours and then 80° C. for 24 hours. The product amounted to 7.0 parts having an average molecular weight of 480±50.

Monomer

The organic cyclic ethers as hereinbefore defined to be telomerized in accordance with the invention include cyclic oxides (such as 1,2-epoxide, oxetane, 3-substituted oxetane or 3,3-disubstituted oxetane) having an oxygen-carbon ring in which an oxygen atom is joined to 2 or 3 carbon atoms in the ring which will open and telomerize with the same or other cyclic oxide monomers in the presence of the catalyst and having up to a total of 18 carbon atoms. These monomers, also may contain 1, 2 or more, preferably only 1, aliphatic carbon-to-carbon double bonds. The alkenyl, ether and halogen (except easily ionizable halogen substituted derivatives) substituted derivatives of these cyclic oxides can likewise be employed. The sulfur analogs of these cyclic oxides may be used. Any of these reagents should be pure or essentially pure to obtain the best results.

Examples of useful cyclic oxides are ethylene oxide (1,2-epoxy ethane), 1,2-propylene oxide, 1,2-butene oxide (or 1,2-epoxy butene), 2,3-butene oxide, 1,2-dodecane monoxide, isobutylene monoxide, styrene oxide, 1,2-pentene oxide, isopentene oxide, 1,2-di-isobutylene oxide, 1,2-hexene oxide, 1,2-heptene oxide, allyl glycidyl ether, crotyl glycidyl ether, isoheptene oxide, 1,2-octene oxide, 1,2-nonene oxide, 1,2-decene oxide, 1,2-hendecene oxide, methyl glycidyl ether, ethyl glycidyl ether, phenyl glycidyl ether, 4-chloro phenyl glycidyl ether, butadiene monoxide, isoprene monoxide, oxetane ($C_3H_6O$), tolyl glycidyl ether, 3,3-dimethyl oxetane, 3-n-nonyl oxetane, 3-allyl-3-methyl oxetane, 3-vinyl-3-methyl oxetane, 1,2-pentadecene oxide, 3,3-diethyl oxetane, 3-ethyl-3-butyl oxetane, 3-chloromethylene oxetane, 3-chloromethyl-3-methyl oxetane, 3-methyl-3-ethyl oxetane, and other cyclic oxides.

The corresponding sulfur analogs in which a sulfur atom replaces the oxygen atom in the cyclic ether are contemplated for use. Examples of such cyclic sulfides are:

4,5-epithio-1-pentene;
5,6-epithio-1-hexene;
5,6-epithio-2-hexene;
9,10-epithio-1-decene;
7,8-epithio-2-methyl-1-octene;
1,2-epithio-1-(2-cyclopenten-1-yl)ethane;
3-allyloxy-1,2-epithio propane;
3-(2-butenyloxy)-1,2-epithio propane;
1,2-epithio-1-(3-cyclohexen-1-yl)ethane;
3-(1-methyl allyloxy)-1,2-epithio propane;
3-(1-methyl-2-butenyloxy)-1,2-epithio propane;
2-(2-cyclohexen-1-yloxy)-1,2-epithio propane;
3-(3-methyl-4-hexenyloxy)-1,2-epithio propane;
ethylene sulfide;
2,3-epithio butane;
1,2-propylene sulfide;
cyclohexene sulfide;
isobutylene sulfide;
styrene sulfide;
vinyl thiirone;
1,2-octene episulfide;
crotyl oxy-1,2-epithio propane;
2-butene sulfide;
2,3-dimethyl-2-butene sulfide;
3,3-dimethyl thiocyclobutane;
3-chloropropene sulfide;
thiocyclobutane;
allyl thio-1,2-epoxy propane;
3-(1-chloro-4-butenyloxy)-1,2-epithio propane;
3-(1-bromo-4-butenyl)-1,2-epithio propane;
3-(1-fluoro-4-butenyl thio)-1,2-epithio propane; and
3-(1-iodo-4-hexenyl thio)-1,2-epoxy propane.

It is preferred to use the lower molecular weight cyclic oxides containing from 2 to 12 carobn atoms, e.g., ethylene oxide, propylene oxide, allyl glycidyl ether, crotyl glycidyl ether, 1,2-butene oxide, phenyl glycidyl ether, styrene oxide, ethyl glycidyl ether and propyl glycidyl ether. Mixtures of 2, 3, 4, 5 or more of the cyclic oxide monomers can be used for telomerization.

Catalyst

Catalysts useable in accordance with the invention are of the class referred to as double metal cyanide complexes which are preferably treated with organic complexing agents. Their preparation has been detailed in prior publications (see U.S. 3,278,457; 3,278,458 and 3,278,459) and in copending U.S. patent application Ser. No. 496,721, filed Oct. 15, 1965 which patents and prior application disclosures on the catalyst preparation are incorporated herein by reference.

The catalyst is most usefully prepared by reacting a transition metal cyanide complex with a metal salt in aqueous media. Removal of a substantial amount or all of the water present in the catalyst is very desirable to enhance the activity of the catalyst although it would appear that removal of all the water is not practicable and may not be desirable. Removal of most of the water and enhancement of the activity of the catalyst is attained by treatment with an additional complexing or coordinating material such as an alcohol, ether, ester, sulfide, ketone, aldehyde, amide, nitrile or mixtures thereof. Preferred organic treating agents are the substantially water-soluble saturated acyclic aliphatic polyethers free of active hydrogen atoms( Zerewitinoff) and having a molecular weight of up to about 400 such as glyme, diglyme, glyet, diglyet and the like.

In general the complex catalysts free of organic treating agents employed in the present invention have the following rational formulae:

$$M_a[M'(CN)_b]_c$$

and/or $$M_a[M'(CH)_r(X)_t]_c$$

M is a metal ion that forms a metal-oxygen bond that is relatively more stable than the coordinate bond between the metal and the nitrogen atom of the cyano, CN group. On the other hand, M' is a transition metal ion that exhibits more than one stable valence and forms a relatively strong covalent bond with the carbon atom of the CN group. An individual catalyst can contain more than one type of M or M' metal ion in its structure. Also, $a$, $b$, and $c$ are numbers whose values are functions of the valences and coordination numbers of M and M', and the total net positive charge on M times $a$ should be equal essentially to the total net negative charge on

[M' (CN)$_b$] or [M' (CN)$_r$(X)$_t$] times $c$

The CN$^-$ group in the catalyst is the bridging group, and can constitute all of the bridging groups in the catalyst. However, the other bridging groups can be present in the catalyst so long as the catalyst contains at least a majority of CN$^-$ bridging groups. Thus, $r$ and $t$ are numbers and $r$ is greater than $t$ times the valence of X and $t$ is zero when only the CN group is the bridging group. Other bridging groups, X in the right hand formula above, which can be present with the CN$^-$ group, can be F$^-$, Cl$^-$, Br$^-$, I$^-$, OH$^-$, NO, O$^{2-}$, CO, H$_2$O, NO$^{2-}$, C$_2$O$_4^{2-}$, or other acid radical, SO$_4^{2-}$, CNO$^-$ (cyanate), CNS$^-$ (thiocyanate), NCO$^-$ (isocyanate), and NCS$^-$ (isothiocyanate) and so forth.

In the above formulae, M is preferably a metal selected from the group consisting of Zn(II), Fe(II), Co(II), and Ni(II). On the other hand, M' is preferably a metal selected from the group consisting of Fe(II), Fe(III), Co(III), and Cr(III).

Examples of preferred catalysts which fall within the above description and which may be used are zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyanocobaltate (III), zinc hexacyanochromate (III), and mixtures thereof.

Telogen

A variety of carboxylic acids may be used in carrying out the new telomerizations. Advantageously, one uses organic acids, particularly polycarboxylic acids, which have an equivalent weight of from 46 to 500. However, the equivalent weight may range from about 46 to 10,000 where equivalent weight is the molecular weight of the compound divided by the number of carboxyl groups.

Useable acids may be substituted by one or more alkyl, cycloalkyl, alkenyl, alkynyl, aryl, alkaryl, and aralkyl groups, corresponding halogenated hydrocarbon radicals, hydroxy containing radicals, and the like. The alkyl group may be, for example, methyl, ethyl, propyl, butyl, stearyl, undecanyl, hexatetracontanyl and the like. The cycloalkyl group may be cyclopentyl, cyclohexyl and the like. The alkenyl group may be, for example, ethenyl, propenyl, butenyl, pentenyl, undecenyl, octadecenyl, oleyl, octenyl and the like. The alkynyl group may be acetylenyl, propynyl, undecininyl and the like. The aryl group may be phenyl, naphthyl, biphenyl, anthracenyl, anthranil, indenyl, acenaphthenyl, phenanthrenyl and the like. The alkaryl group includes tolyl, toluyl, ethylphenyl, diethylphenyl, tetraethylphenyl, butylphenyl, alpha-methylnaphthyl and the like. The aralkyl group includes phenylethyl, phenylpropyl, toluylpropyl, benzyl, cinnamyl, phenylneopentyl, vinylcyclohexyl and the like. The hydroxyl containing radicals may be citryl, ricinoleyl, diphenolyl, and the like.

The acid may also include alkylene, alkenylene, alkynylene, arylenes, alkarylenes, aralkarylenes and similar radicals. The alkylenes are those having the formula:

—C$_a$H$_{2a}$— where $a$ is an integer of 2 to 40 and can include ethylene, propylene, isopropylene, butylene, undecylene, octadecylene and the like. The alkenylene group are those having the formula: —C$_a$H$_{2a-2}$ and —C$_b$H$_{2b-4}$ where $a$ has the above-identified meaning and $b$ is an integer of 4 to 40, included in this formula would be the acetylene compounds and the dienyl compounds such as acetylene, propynylene, butynylene and the like, butadienylene, methylbutynylene and the like. Arylenes are those of the formula:

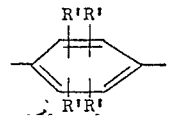

where R' is a monovalent substituent selected from the group consisting of hydrogen, hydrocarbon radicals, hydrocarbonoxy radicals, halohydrocarbon radicals, halohydrocarbonoxy radicals, nitro groups, and halogen, that is, fluorine, chlorine, bromine, and iodine.

The following monocarboxylic acids can be employed in the process of this invention: acetic, formic propionic, valeric, capyrylic, pelargonic, lauric, myristic, palmitic, stearic, behenic, hexatriacontanoic and like acids. Also included in the monocarboxylic acids are: acrylic methacrylic, beta-methacrylic, crotonic, isocrotonic, vinylacetic, dimethylacrylic, beta-pentenoic, itaconic, allylacetic, angelic, antiglic, teracrylic, pyroterebic, undecylenic, oleic, arucic, vinylacrylic, sorbic, geranic, linoleic, linolenic, propiolic, tetrolic, dehydro-undecylenic, 4-pentylnoic, monochloro-acetic, bromoacetic, dichloroacetic, trichloro-acetic, alpha-chloropropionic, beta-chloropropionic, beta, beta-dichloropropionic, alpha,beta-dichloropropionic, alpha-chloroacrylic and beta-chloroacrylic, alpha-chlorocrotonic, beta-chloroisocrotonic, glycolic, lactic, alpha-hydroxybutyric, isovaleric, beta-hydroxypropionic, beta-hydroxy-n-valeric, gamma-hydroxybutyric, omega-hydroxyvaleric, epsilonhydroxy caproic, benzoic, p-ethyl benzoic acid, cinnamic, benzilic, alpha-naphthoic, beta-naphthoic, diphenic and like acids.

Polycarboxylic acids which can be employed in the process of this invention include oxalic, malonic, succinic, glutaric, adipic, pimelic, suberic, azaleic, sebacic, maleic, fumaric, citraconic, mesaconic, itaconic, pyrocinchoninic, glytaconic, phthalic, isophthalic, terephthalic, hemimellitic, pyromellitic, prehnitic, mellophanic, naphthalene-1,2-dicarboxylic acid and like acids.

Also, as acids there can be used the reaction product of 1 mol of hexane triol and 3 mols of succinic acid, 1 mol of pentaerythritol and 4 mols of adipic acid, 1 mol of pentitol and 5 mols of adipic acid, or the reaction product of 1 mol of sorbitol or mannitol and 6 mols of adipic acid or other dicarboxylic acid to make carboxylic acids having 4 to 6 carboxylic groups and so forth. Yet other acids can be used such as those produced by the reaction of the sufficient amount of a dicarboxylic acid such as succinic acid, adipic acid, subaric acid, etc., to react with each hydroxyl of a polyol (usually a mol ratio of 2:1) like glycol, diethylene glycol, propylene glycol, 1,4-butane diol and the like as well as with occasional mixture of diols and a small amount of a triol such as hexane triol, glycerol, etc.

Mixtures of the various organic acid telogens disclosed herein can be used. There also can be used as acids homopolymers and copolymers containing acidic groups such as homopolymers and copolymers of acrylic acid, methacrylic acid and the like by themselves or with comonomers like methyl acrylate, ethyl acrylate, beta-hydroxy ethyl acrylate, methyl methacrylate, ethyl methacrylate, methyl ethacrylate, ethyl ethacrylate, styrene, butadiene, acrylonitrile, isoprene and the like.

As previously stated, other classes of substances may be used as telogens in the new telomerizations besides carboxylic acids. One such class are primary and secondary amines which have an amino nitrogen atom attached to an aromatic radical. Any aromatic group substitution is considered suitable although monocyclic aryl amines are preferred, e.g., aniline, N-alkyl, anilines, p-phenylene diamine, p-aminophenol, p-methyl aniline, p-aminobenzoic acid, m-chloro aniline, o-hexyl aniline, 2,4,5-dichloro aniline, p-iodoaniline, m-bromoaniline, 2-methyl-4-chloro aniline, 4-(p-aminophenyl)butanol, N-phenyl hexamethyl-

ene diamine, N-(p-tolyl)diethylene triamine and the like. If the nitrogen atom of a secondary amine is attached to two aromatic rings, steric hindrance around the nitrogen atom will reduce the reactivity of the amine as a telogen, e.g., phenyl-beta-naphthylamine. Aromatic amines other than monocyclic aryl amines may be used, e.g., naphthylamide, N - phenyl-N'-naphthyl ethylene diamine, N-naphthyl-N'-hydroxy hexamethylene diamine, etc.

The nature of the end group of the telomer obtained using amines depends upon the structure of the telogen and the reaction conditions. If a primary amine is used as the telogen, two types of difunctional products are possible. Both hydrogen atoms attached to the nitrogen atom can be replaced to give a diol, or only one hydrogen atom can be replaced to give a compound with a hydroxyl group at one end and a sec.-amine group at the other end of the polymer chain. To replace both hydrogen atoms requires more vigorous conditions—elevated temperature and active catalyst. If a sec.-amine group is desired, more moderate conditions and catalyst are effective. If a secondary monoamine is used as the telogen, then the telomer contains a hydroxyl group at one end and a tert.-amine at the other.

Another class of compounds useable as telogens are amides which contain an aromatic group in the molecule, i.e., the aromatic substituent need not be connected to the amido nitrogen atom directly. Such telogens may be diamines, including substituted ureas, polyamides, aminoamides, etc., which contain a primary or secondary amide group. Any aromatic group substitution is considered suitable although monocyclic aryl substituted amides are preferred, e.g., benzamide, acetanilide, carbanilide, 2,2'-dimethylcarbanilide, p - hydroxy benzamide, N - phenyl formamide, N-naphthyl-N'-phenyl urea, N-(p-chloro phenyl) acetamide, phthalimide, N-(p-nitrophenyl)acetamide, N-methyl-N'-hexyl phthalamide, N,N'-diacetyl phenylenediamine, and N,N'-dibenzoyl ethylene diamine. Other aryl substituted amides which may be considered useable include: 2-naphthyl-N,N'-diformyl propylene diamine, N-phenyl adipamide, benzene sulfonamide, sulfadiazine, sulfaguanidine, N-1-naphthyl benzamidine, N, N'-diphenyl acetamidine, N-phenylthiourea and the like. Furthermore, crude reaction by-products may serve as telomers for use in the invention. For example, in the manufacture of toluene diisocyanate, a residue, the so-called "bottoms," remains in the still pot after the diisocyanate is distilled. Part of this residue consists of high molecular weight substituted urea and urethanes, which can be a cheap base for making polyols by the invention, e.g., as the telogen in telomerization of propylene oxide. Other materials which can be used are the reaction products of isocyanates such as polyisocyanates, tolylene diisocyanates, for example with primary amines like aniline; the reaction products of phosgene and the amines such as p-phenylene diamines; and the reaction products of ureas and the amines.

The nature of the end group of the telomer obtained using amides depends upon the structure of the telogen and the reaction conditions. If a primary amide is used as the telogen, two types of difunctional products are possible. Both hydrogen atoms attached to the nitrogen atom can be replaced to give a diol or only one hydrogen atom can be replaced to give a compound with a hydroxyl group at one end and a sec.-amide group at the other end. If a sec.-amide or a mono-N-substituted urea is used as the telogen, then the telomer contains a hydroxyl group at one end and a tert.-amide group at the other.

As another class of telogens, one may use ethynyl and active methylene compounds which includes acetylene and substituted acetylenes, beta-diketones, beta-ketoesters, malonic esters, malonic nitriles, beta-dinitriles and tricarbonyl compounds. Such compounds may include malononitrile, diethyl malonate, 1-hexyne, methyl acetoacetate, ethyl 2-pentynoate, glycoluril, hexyl methyl malonate, ethyl alphacyano propionate, acetyl acetone, 2,4-octanedione, 1,5-diphenyl-2,4-pentanedione, hexyl acetylene, p-chlorophenyl acetylene, methyl p-toluyl acetate, dibenzoyl acetic ester and the like. The most effective methylene telogens have activated hydrogen atoms and functional groups that can coordinate to the cation in the metal cyanide complex catalysts.

If both active hydrogen atoms are replaced in a compound such as malonic ester, the polyether is a diol with two ester groups in the center of the polymer chain. Usually the first hydrogen atom is replaced more easily than the second. Acetylene has two active hydrogen atoms. Therefore, the product of the telomerization reaction is a polyether diol with an acetylene group in the center of the polymer chain. If the ethynyl or active methylene compound has other functional groups that can participate in this telomerization reaction such as —OH, RNH—, and

then the hydroxyl functionality of the telomer is increased. Because these latter functional groups may be more reactive in telomerization than the former groups, more vigorous conditions (higher temperatures and a higher concentration of catalyst) are required to insure that both types of functional groups participate in the reaction.

The amount of monomer to be used with relation to the telogen will depend on the ultimate purpose to be achieved. In general, the ratio of the mols of the epoxide or monomer to the number of functional groups of the telogen will vary from about 10,000:1 to 1:10, preferably from about 240:1 to 1:1. It can be said that there should be at least 1 mol of monomer per mol telogen and at least sufficient monomer should be used to provide a plurality of new ether linkages. It will be appreciated that where a relatively high molecular weight (150,000) polyalkylene ether ester is desired, the mol ratio of the epoxide or oxetane monomer such as ethylene oxide to a low molecular weight telogen, e.g., acetic acid, having only one functional group will be rather high, for example, about 3400 to 1. In making a 4000 M.W. polymer from propylene oxide and isophthalic acid, the mol ratio of epoxide to telogen is about 66:1 and the ratio of mols epoxide to carboxylic groups of the telogen is about 33:1. On the other hand, starting with an acidic copolymer of acrylic acid and methyl acrylate where it is desired to alter its crystallinity, film forming characteristics, and the like, it may only be necessary to react with a portion of the carboxylic groups to get the desired results. In the latter case from a statistical standpoint, even if sufficient epoxide were used to theoretically react with all of the —COOH groups, it is likely that some will not be reacted while others will have more than one ether linkage. It can be said that in the type of polymerization system under consideration, the cyclic ether taxogen will continue to polymerize on the telogen as long as monomer is fed to the system and so long as any impurities in it do not stop polymerization or telomerization and/or so long as the catalyst is not deactivated. The process of this invention is particularly directed to the obtainment of low molecular weight (up to 10,000), polymers having an OH functionality of about 2 and up to about 6, but it can be used to obtain high molecular weight polymers having a functionality of between 1 and 2.

This method may be used to modify high molecular weight copolymers such as those shown above, as well as carboxylic terminated substantially linear polymers such as carboxy terminated polybutadienes. Thus, when a solution of a carboxylic containing high polymer, the polymerizable cyclic ether monomer and the catalyst are brought together, the cyclic ether would add to the carboxylic groups. This process is usually referred to as grafting when applied to high molecular weight polymers, but may be seen to involve the same sequence of reactions herein described as telomerization when applied to small molecules.

The monomers can be telomerized with the telogen in the presence of the catalyst in mass (bulk), or in solvent (which can facilitate handling and transfer of heat). They, also, can be telomerized under inert and/or non-oxidizing conditions, for example, under an atmosphere of nitrogen, argon, neon, helium, krypton or other inert atmosphere. Alternatively, the inert gas can be omitted and the monomer telomerized only under pressure from any vaporized solvent if used, vaporized monomer or telogen. In some instances the telomerization can be conducted in reactors containing or open to the air provided the air is free of materials which would inhibit telomerization (i.e., conversion or molecular weight) and especially free of $H_2O$, although this procedure can be hazardous for some of the monomers are flammable. Also, some telomerization reactions go so fast as to be explosive. Advantageously, solvents are used in which the monomer and telogen are soluble. The solvent should be an inert or non-reactive to the reactants. Examples of useful solvents are heptane, octane, cyclohexane, toluene, benzene, trimethylpentane, tetrahydrofuran, methylene chloride, chloroform, trichloroethylene, and so forth and mixtures of the same.

The reactants should be relatively pure, by which is meant that the starting materials should be free, or essentially free, of water or other impurities which would reduce the effectiveness of, or kill the catalyst, or prevent the obtainment of the desired molecular weight of the polymer or the desired functionality of the polymer or slow, stop or prevent the reaction between the cyclic oxide and the telogen.

Since many of the reactants are volatile, the telomerization is advantageously conducted in a closed container and may be under pressure, e.g., 1 to 1000 grams/sq. cm. Pressure should be at least sufficient to maintain the liquid state for dispersion of catalyst and heat transfer although it is possible to bubble monomer into the solution.

Telomerization can be conducted at temperatures of from about 0° C. to 100° C., although somewhat wider temperature ranges can be used, e.g., −10 to 180° C. Preferably, temperatures of from about 25° C. to 80° C. are used for telomerization. An induction period of about ¼ to 2 hours or more may be observed with some of the catalysts. It is very desirable to telomerize while agitating the monomer(s), catalyst, telogen and solvent.

The catalyst generally becomes very well dispersed if not completely dissolved (molecularly dispersed) in the polymerization solution. Thus, centrifugation even after dilution in a non-viscous solvent does not usually remove a major proportion of the catalyst from the polymer. Chemical methods, however, have been found useful in removing major amounts of the catalyst. Ion exchange of the polymer in water-methanol solution can reduce the conductivity of the telomer many fold by reducing the catalyst or catalyst residue content. Passage through a bed of activated alumina either with or without a prior treatment with aqueous ammonia also reduces the catalyst residue in such polymers. The necessity of removal of the catalyst will depend on ultimate use of the polymer.

The amount of the catalyst employed in the process of this invention is not narrowly critical and is used in a minor amount sufficient to effect polymerization. It can vary from about .003% to about 5% by weight based on the polymerizable cyclic ether employed and is advantageously employed in an amount of from about .01% to 0.2%, by weight based on the amount of the cyclic ether employed.

The propagation step of this reaction is exothermic. Some monomers may telomerize very rapidly in the presence of this catalyst. This may be controlled by the concentration of the catalyst, by use of a diluent, and by the proper choice of temperature. Since heat transfer during propagation and transfer may be critical in medium and large size bath reactors, loop type reactors can be used to reduce the induction period by temperature cycling in the loop when the product is a liquid or semiliquid. Also, continuous telomerization systems may be used in which the telogen or monomer is fed into the system and polymer, etc., withdrawn.

Gel formation during telomerization with unsaturated monomers is not usually observed using the double metal cyanide catalysts and consequently gel inhibitors are not normally required. Antioxidants or antidegradants such as phenyl beta naphthylamine, PBNA, or other antidegradants are desirably added prior to or after polymerization to avoid degradation which might occur. PBNA may be used in an amount by weight approximately equal to the amount of the catalyst during telomerization. Some antidegradants may retard polymerization and should be added after telomerization.

In telomerizing according to the present invention, it is preferred to add the ingredients to the reactor in the following order: telogen, catalyst and monomer. However, for many purposes, all three materials can be added at once.

Incremental addition of monomer and telogen can be used to vary the molecular weight distribution of the telomer product. When the monomer is added incrementally, the distribution of molecular weights becomes narrower, apparently as a result of the mass action law, i.e., when the concentration of the monomer is lower, the transfer reaction is comparatively favored. On the other hand, incremental addition of the telogen leads to a wider distribution of molecular weight for essentially the same reason as above, i.e., the concentration of the transfer agent is initially lower and thereby the propagation step is favored.

By the use of incremental, alternate addition of a plurality of monomers, it is possible to form telomeric ethers having telomer moieties in the form of block copolymers. By this procedure, for example, using a pair of alkylene oxides of the formulae:

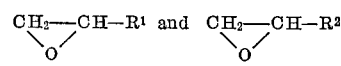

wherein $R^1$ and $R^2$ are dissimilar radicals from the group hydrogen, hydrocarbon, carbonoxycarbon, and halohydrocarbon having up to 16 carbon atoms, preferably alkyl radicals of 1 to 6 carbon atoms and carboxylic acid as the telogen, telomeric esters may be formed containing at least one copolymer unit of the formula:

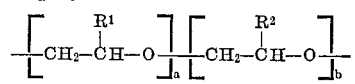

wherein $a$ and $b$ are integers and $a$ is typically greater than 5. Also, $b$ may be an integer typically greater than 5. Due to different reactivity rates, the blocks do not necessarily have all of the time the same number of monomeric units in each copolymer unit or in each molecule at the end of each addition or at the end of polymerization. Hence, $a$ and $b$ are not necessarily equal.

The solvent can be added separately or mixed with one or more of the ingredients. It can be added to the reactor first.

The polymers and copolymers (or telomers and cotelomers) prepared according to the method of the present invention have average molecular weights of at least 300, preferably from about 300 to 10,000, and even up to 150,000 or higher, such as up to 1,000,000 or more. They vary physically from light oils to tacky solids or semisolids, or even to solids, all of which are characteristically non-gelled. Some are one phase polymeric substances, others may contain two phases, one an oil and the other a crystalline polymer or high molecular weight polymer. Depending on the telogen used, they will have an average of from one to four or more hydroxyl groups and a plurality of ether linkages as expressed by the general formula given hereinbefore.

The polymer generally grows at one end with the monofunctional telogen and at both ends of the di (or higher) functional telogens. The use of some unsaturated monomers permits the resulting cotelomer to be vulcanized after extending with diisocyanate or other extending agent for use as a rubber. These polymers on the average characteristically have a small percentage of unsaturated end groups. The end group unsaturation (from about .005 to .020 mole equivalents unsaturation/gram) of the polymers remains constant as the molecular weight increases. Thus, the proportion of unsaturated end groups to hydroxyl end groups increases as the molecular weight increases. Nevertheless, polyethers prepared by the method of this invention have a low amount of unsaturation. For example, a polyether glycol of this invention having an average molecular weight of about 4000 may have 0.01 mole equivalent unsaturation per gram whereas a polyether glycol prepared with KOH and having an average molecular weight of about 3000 will have about 0.08 mole equivalent unsaturation per gram. As pointed out herein, polyether ester polyols having average molecular weights of from about 300 to 10,000 are preferred, and these molecular weights are obtained by shutting off the supply of epoxide, or by adding only a sufficient amount of the epoxide, to the polymerization system, or by killing the catalyst when the polymerization reaction has proceeded to the desired degree.

The telomers produced by the method of the present invention are useful in many ways. They are useful as nonionic surface active agents, as lubricants for metal to metal surfaces, as textile sizes or finishing agents, as coolants for internal combustion engines and as hydraulic brake fluids. They can be used to make protective coatings and films for packaging. Telomers having average hydroxyl functionalities of 2, 3 or more hydroxyl groups per molecule can be used in making flexible and rigid polyurethane foams (for pillows, mattresses, insulation for refrigerators) by reaction with polyisocyanates, in the presence of tertiary amines, tin or other catalysts, silicones and so forth. Such telomers can also be employed in making millable (gums) or castable polyurethanes for bushings, coatings (clothing), laminates (wall panels), etc. The liquid telomers of this invention having an average molecular weight up to about 5000 from propylene oxide or butene oxide, etc., and a low molecular weight dicarboxylic acid are useful in making polyurethanes. When such millable gums contain unsaturation (carbon-to-carbon double bonds), they may be cured by conventional rubber curing procedures depending on the amount of unsaturation such as by using natural or butyl rubber curing systems or peroxides, etc. The telomers of this invention, also, can be used to make polyurethanes by reaction with phosgene and diamine.

The polymers (telomers and cotelomers) prepared by the method of the present invention as well as their extension products with isocyanates, etc., may be compounded or mixed if desired with the usual rubber and plastic compounding materials such as curing agents, antidegradants, fillers, extenders, ultraviolet light absorbers, fire resistant materials, dyes, pigments, plasticizers, lubricants, other rubbers, resins, plastics and the like.

Where telomers of the invention are made using amines as the telogen, one can take advantage of amine groups created in the telomers either at the end or in the middle of the telomer chain by using them in cross-linking reactions with carboxylic acids or appropriate metal salts. Also, some of the telomers that contain secondary amine groups are useful as antiozonants and antioxidants. If an unsaturated epoxide such as allyl glycidyl ether is used in the telomerization, e.g., in conjunction with propylene oxide as the monomer material, then one is able to make antiozonants that can be cured directly in rubber and will not be lost by migration and evaporation.

In the case of telomers made using amides as the telogen to contain a hydroxy group at one end of the chain and a tertiary amide on the other, such telomers may be cross-linked through metal salts that coordinate to the nitrogen atom in preference to the oxygen atom.

The amide produced telomers may also be reduced to give amine terminal which can function in a number of cross-linking reactions.

I claim:
1. A process for the production of hydroxyl or thiol terminated alkylene ether telomeric carboxylic esters of molecular weight between about 300 to 1,000,000 composed of one or more hydroxyl or thiol terminated alkylene ether telomer moieties joined by a carboxylic group to a carboxylic acid moiety which comprises reacting at least one polymerizable cyclic ether containing 2 to 18 carbon atoms of the formula:

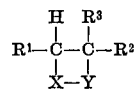

wherein
X is oxygen or sulfur,
Y is —CH$_2$— or the bond in the cyclic ether between the carbon atom and the heteroatom "X", and
R$^1$, R$^2$ and R$^3$ are hydrogen, hydrocarbon, halohydrocarbon, carbonoxycarbon, carbonthiacarbon, halocarbonoxycarbon or halocarbonthiacarbon radicals,
with a carboxylic acid in the presence of a catalytic amount of a double metal cyanide complex catalyst, the ratio of the number of moles of said cyclic ether to the number of carboxylic groups of said acid being from about 10,000:1 to 1:10.

2. A method as claimed in claim 1 wherein said carboxylic acid contains one to four carboxyl groups and has a molecular weight of from about 46 to 1000.

3. A method as claimed in claim 1 wherein the ratio of moles of cyclic ether to the number of carboxylic groups in said acid is between about 240:1 and 1:1 and wherein the catalyst is used in an amount from about 0.003 to 5% by weight based upon the weight of cyclic ether.

4. A method as claimed in claim 1 wherein the reaction temperature is from about —10° to 180° C. and the reaction is carried out for about 1 to 24 hours, the time being shorter the higher the temperature.

5. A method as claimed in claim 2 wherein the cyclic ether is propylene oxide and the carboxylic acid is isophthalic acid used in the proportion of 150 to 6.2 parts respectively, said catalyst is zinc hexacyanocobaltate (III) complex with the dimethyl ether of ethylene glycol and the reaction is conducted at 50° C. for 20 hours to yield a clear liquid product containing 0.55 mmole of hydroxyl per gram.

6. A process for the production of alkylene ether telomers having an average molecular weight between about 300 and 1,000,000 of the general formula:

wherein:
A is the moiety of an alpha-beta unsaturated alkylene dicarboxylic acid of 4 to 42 carbon atoms, and
T is the telomer moiety of a C$_2$–C$_{12}$ cyclic oxide containing only carbon, hydrogen and oxygen atoms having 2 or 3 carbon atoms in the cyclic ether ring which comprises reacting an alpha-beta unsaturated alkylene dicarboxylic acid of 4 to 42 carbon atoms with at least one C$_2$–C$_{12}$ cyclic oxide containing only carbon, hydrogen and oxygen atoms having 2 or 3 carbon atoms in the cyclic ether ring, the ratio of the number of moles of said cyclic ether to the number of carboxylic groups of said acid being from about 10,000:1 to 1:10, in the presence of a catalytic amount of a double metal cyanide complex catalyst selected from the group consisting of zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyanocobaltate (III), zinc hexacyanochromate (III) complexed with a substantially water soluble saturated acyclic aliphatic polyether free of active hydrogen atoms having a molecular weight up to about 400 and mixtures of such catalysts.

7. A process for the production of hydroxyl or thiol terminated alkylene ether telomers having an average molecular weight between about 300 and 10,000 of the general formula:

$$HX-T-O-\overset{O}{\underset{\|}{C}}-R-\overset{O}{\underset{\|}{C}}-O-T-XH$$

wherein
R is a hydrocarbon radical containing between 2 and 40 carbon atoms, and
T is the telomer moiety from a polymerizable cyclic ether taxogen containing 2 to 18 carbon atoms of the formula:

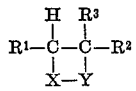

wherein
X is oxygen or sulfur,
Y is —CH$_2$— or the bond in the cyclic ether taxogen between the carbon atom and the heteroatom "X," and R$^1$, R$^2$ and R$^3$ are hydrogen or hydrocarbon radicals, which comprises polymerizing a cyclic ether taxogen of said formula with a catalytic amount of a double metal cyanide complex catalyst in the presence of a dicarboxylic acid of the general formula:

$$HOOC-R-COOH$$

wherein R has the meaning aforesaid.

8. The process of claim 7 wherein said cyclic ether taxogen is selected from the group consisting of C$_2$ to C$_{12}$ cyclic oxides of said formula containing only carbon, hydrogen and oxygen atoms, said dicarboxylic acid has the formula:

$$HOOC-C_aH_{2a-2}-COOH$$

wherein $a$ is an integer from 2 to 40, and said telomers are hydroxyl terminated.

9. The process of claim 8 wherein said acid is an alpha-beta unsaturated dicarboxylic acid and said cyclic oxide is 1,2-propylene oxide, 1,2-butylene oxide or mixtures thereof.

10. The process of claim 7 wherein said acid is maleic acid.

11. The process of claim 7 wherein said acid is fumaric acid.

12. A method of producing hydroxyl or thiol terminated alkylene ether telomers having an average molecular weight between 300 and 10,000 which comprises polymerizing a cyclic ether taxogen having the formula:

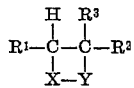

wherein
X is oxygen or sulfur,
Y is —CH$_2$— or the bond in the cyclic ether taxogen between the carbon atom and the heteroatom "X," and R$^1$, R$^2$ and R$^3$ are hydrogen or hydrocarbon radicals, with a catalytic amount of a double metal cyanide complex catalyst in the presence of a carboxylic acid as a telogen.

13. The process of claim 12 wherein said telogen is a dicarboxylic acid of the formula:

$$HOOC-C_aH_{2a-2}-COOH$$

wherein $a$ is an integer from 2 to 40.

14. The process of claim 12 wherein the cyclic ether taxogen is an alkylene oxide having 2 to 3 carbon atoms in the cyclic ether ring and the resulting telomer is hydroxyl terminated.

15. The process of claim 14 wherein said catalyst is a zinc hexacyanocobaltate (III)-glyme.

References Cited

UNITED STATES PATENTS

| | | | |
|---|---|---|---|
| 2,674,619 | 4/1954 | Lundsted | 260—485 |
| 3,250,802 | 5/1966 | Verdol | 260—485 |
| 3,278,457 | 10/1966 | Milgrom | 260—2 |
| 3,360,545 | 12/1967 | Wygant | 260—485 |
| 3,441,616 | 4/1969 | Pizzini et al. | 260—485 |

FOREIGN PATENTS

| | | |
|---|---|---|
| 6611403 | 2/1967 | Netherlands. |
| 6614355 | 4/1967 | Netherlands. |

LORRAINE WEINBERGER, Primary Examiner

E. J. SKELLY, Assistant Examiner

U.S. Cl. X.R.

260—552 R, 553 A, 553 C, 556 AR, 558 R, 559 R, 559 T, 561 H, 562 R, 564 R, 571, 574, 575, 576, 577, 578, 590, 594, 609 A, 611 A, 615 B, 250 R, 326.55, 326.5 B, 399, 410.6, 465.4, 465.6, 465.8 R, 468 R, 468 B, 469, 470, 471 R, 473 R, 476 R, 481 R, 483, 484 R, 485 G, 486 B, 487, 496, 518 R

GT-438

PO-1050
(5/69)

UNITED STATES PATENT OFFICE
CERTIFICATE OF CORRECTION

Patent No. 3,654,224      Dated April 4, 1972

Inventor(s) Jack Milgrom

It is certified that error appears in the above-identified patent and that said Letters Patent are hereby corrected as shown below:

Column 2, between lines 4 and 5, there should be inserted --The double metal cyanide complex catalysts effect--.

Column 10, line 7, which reads "2-(2-cyclohexen-1-yloxy)-1,2-epithio propane" should read --3-(2-cyclohexen-1-yloxy) 1,2-epithio propane--.

Column 11, line 17, which reads "$NO^{2-}$" should read --$NO_2^-$--.

Column 13, line 6-7, which reads "naphthylamide" should read --naphthylamine--.

Column 13, line 28, which reads "diamines" should read --diamides--.

Signed and sealed this 12th day of September 1972.

(SEAL)
Attest:

EDWARD M. FLETCHER, JR.
Attesting Officer

ROBERT GOTTSCHALK
Commissioner of Patents